(12) United States Patent
Guo et al.

(10) Patent No.: US 7,464,230 B2
(45) Date of Patent: Dec. 9, 2008

(54) MEMORY CONTROLLING METHOD

(75) Inventors: Jiun-In Guo, Computer Science and Information Engineering Department of CCU, 5F-5, 168 San-Hsing, Ming Hsiung, Chia-Yi (TW); Chih-Ta Chien, Chia-Yi (TW); Chia-Jui Huang, Chia-Yi (TW)

(73) Assignee: Jiun-In Guo, Chia-Yi (TW)

( * ) Notice: Subject to any disclaimer, the term of this patent is extended or adjusted under 35 U.S.C. 154(b) by 284 days.

(21) Appl. No.: 11/517,410

(22) Filed: Sep. 8, 2006

(65) Prior Publication Data

US 2008/0065819 A1 Mar. 13, 2008

(51) Int. Cl.
*G06F 12/00* (2006.01)

(52) U.S. Cl. .................. 711/154; 711/105; 711/213; 711/220

(58) Field of Classification Search ............... 711/105, 711/154, 213, 220
See application file for complete search history.

(56) References Cited

U.S. PATENT DOCUMENTS

| 4,378,588 | A | * | 3/1983 | Katzman et al. | 710/57 |
| 5,193,179 | A | * | 3/1993 | Laprade et al. | 714/47 |
| 5,426,751 | A | * | 6/1995 | Sawamoto | 711/2 |
| 5,570,202 | A | * | 10/1996 | Shishido et al. | 358/405 |
| 5,777,629 | A | * | 7/1998 | Baldwin | 345/506 |
| 5,798,770 | A | * | 8/1998 | Baldwin | 345/506 |

* cited by examiner

*Primary Examiner*—Stephen C Elmore
(74) *Attorney, Agent, or Firm*—Rosenberg, Klein & Lee

(57) ABSTRACT

A method for memory controlling is disclosed. It includes an embedded address generator and a controlling scheme of burst terminates burst, which could erase the latency caused by bus interface during the access of non-continuous addresses. Moreover, it includes a controlling scheme of anticipative row activating, which could reduce the latency across different rows of memory by data access. The method could improve the access efficiency and power consumption of memory.

6 Claims, 7 Drawing Sheets

MEMORY CONTROLLING METHOD

BACKGROUND

1. Field of Invention

The present invention relates to a memory controlling method. More particularly, the present invention relates to a memory controlling method with an advanced high-performance bus interface.

2. Description of Related Art

In the digital signal processing systems or media video systems, a large amount of memory is needed to store the data the system requires. Therefore, SDRAM is extensively used in this kind of system because of its high capacity and low cost quality. However, when SDRAM accesses memory, the latency is very long.

Several SDRAM controllers have been proposed to make efficient use of the SDRAM. One is to schedule the requests of data access, and allow the accesses in the same row of a specific bank can be performed together as most as possible. This method reduces the switching frequency of transfers between different rows. Another approach focuses on data arrangement in memory. By analysis of data access for specific applications, the data arrangement can be optimized for reducing the data access latency. A history-based predictive approach is also proposed to reduce frequency of row activation. This approach predicts the next operation mode based on the history of memory reference. Thus, the row opening frequency is decreased and the latency reduced when the historical distribution is used.

In SDRAM, one reading transfer needs to issue a read command and the read data are available after the delay of the column address strobe (CAS) latency. In the advanced high-performance bus (AHB) bus, a transfer is separately composed of an address phase and a data phase, and the data phase of current transfer is overlapped with the address phase of next transfer. Hence, the address of the impending non-sequential transfer is not available before the data phase of the last transfer in a sequential access. Therefore when accessing the non-continuous address, the data can not be outputted continuously, meaning that each time when accessing a non-continuous address, there will be CAS latency at least that causes a low access rate.

Therefore, an optimizing scheme to enhance memory access efficiency with SDRAM traits is a problem in the known technique.

SUMMARY

It is therefore an objective of the present invention to provide a memory controlling method. This system includes an embedded address generator to overcome the limitation of the fact that the address cannot be known earlier in the communication standard of the advanced high-performance bus.

It is another objective of the present invention to provide a memory controlling method, including burst terminates burst (BTB) and anticipative row activation (ARA) in order to reduce the latency of the memory accessing.

According to the aforementioned objectives of the present invention, a memory controlling method is provided. In accordance with one embodiment of the present invention, allocating a memory mapped space larger than physical memory size for getting additional addressing bits used to transfer the mode control information (MCI), and using the mode control information to setup a stride value and a sequential data length for a 2-dimensional (2-D) data access. Then, an embedded address generator is used to obtain the non-sequential addresses of a 2-dimensional data accessing in advance. Then we can overcome the communication restriction from AHB interface and reduce the latency, in order to enhance the memory access efficiency and offer the access expansion mode.

According to another objective of the present invention, a memory controlling method is disclosed. In one embodiment of the present invention, the continuous data length and the succeeding non-continuous accessing address is known in advance, this invention proposes a memory controlling method, Burst Terminates Burst (BTB), which issues the SDRAM read/write command of impending non-continuous access to terminate the current burst transfer to reduce the latency of the non-continuous data, and then raise the data accessing efficiency in a fixed period of time.

The present invention proposes an anticipative row activating (ARA) method, storing the image/pixel data in the order of interlaced banks with sequential rows. In other words, this kind of memory organization limits the 2-dimensional data access into two situations. First, the next non-continuous data lie in the present memory row, and we can utilize the accessing method of BTB in order to reduce latency in this situation. Second, the next non-continuous data lie in the memory row of a different bank, in this case, this invention utilizes the waiting period for the SDRAM commands to activate the memory row in which the next non-sequential data located in advance. This fact reduces the latency of the accesses switched over different memory banks and rows. According to the above-mentioned contents, this invention has the following advantages:

1. This invention applies to the advanced high-performance bus as a scheme to optimize the accessing efficiency in order to reduce the latency when the accessing addresses are non-continuous.

2. This invention utilizes the controlling of ARA to reduce the latency induced by the frequent switches of memory bank/row.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
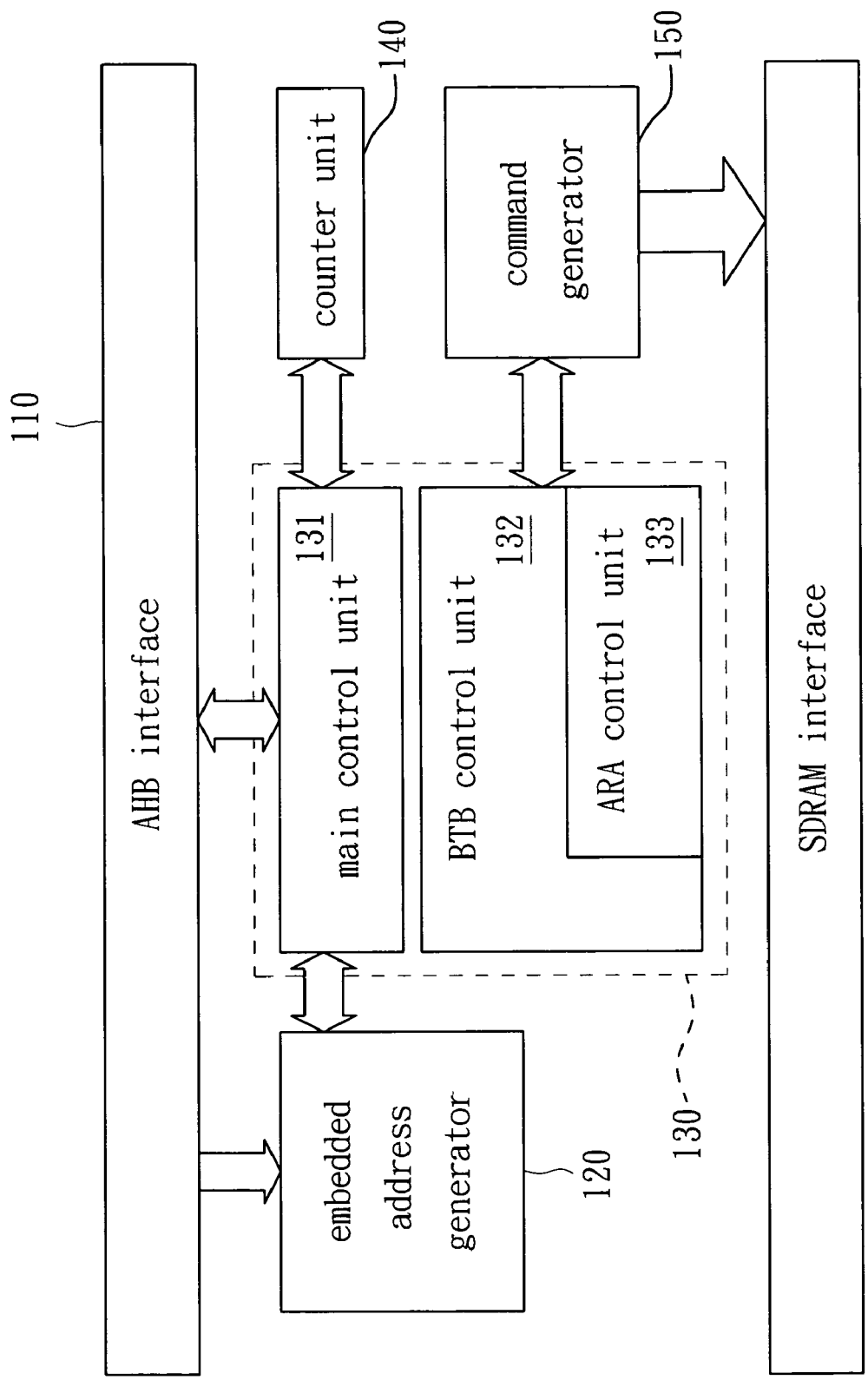
FIG. 1 is a schematic block diagram of SDRAM controller of the preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Refer to FIG. 1. FIG. 1 shows a schematic block diagram of SDRAM controller of the preferred embodiment of the present invention. According to the address and controlling information, the AHB interface 110 accepts the AHB master accessing requests to determine whether EAG 120 is enabled or not. If it is enabled, it means low latency accessing mode. If it is not enabled, it is the general reading/writing mode.

In the low latency accessing mode the BTB control unit 132 and ARA control unit 133 are enabled through main control unit 131 in the memory control core 130 to achieve the optimization scheme. In the general reading/writing mode, only the partial functions of the BTB control unit 132 are enabled.

The controlling procedures are based on the counting information from the counter unit 140 and send the required actions to the command generator 150 in order to meet the requirements for generating controlling signals of SDRAM.

Figure 2A:
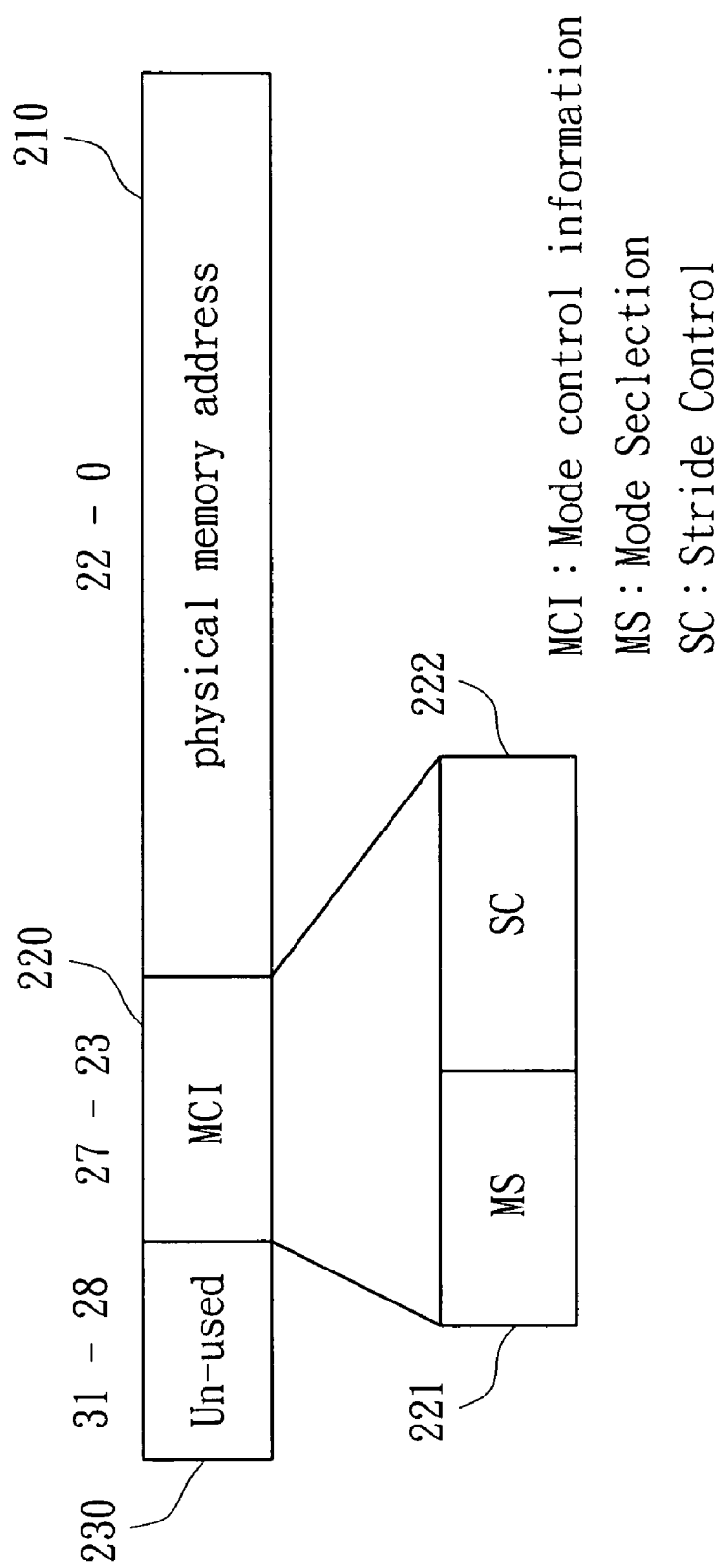
FIG. 2(a) is a schematic diagram of an 8 MB memory address bus of the preferred embodiment of the present invention.

Reference is made to FIG. 2(a), which shows a schematic diagram of an 8 MB memory address bus of a preferred embodiment of the present invention. The width of AHB address bus is 32 bits. This invention gains bits used as mode control information 220 by allocating a memory-mapped space larger than the physical memory size. When the allocated space is larger than the addressing space of the physical memory, the corresponding address bits are larger than the bits the physical memory space needs. The redundant address bits are used to transfer the mode control information in the low latency accessing mode. Bit 0 to Bit 22 are physical memory addresses 210. This invention uses bit 23 to bit 27 for the mode controlling information 220. The mode controlling information 220 includes two columns, mode selection 221 and stride control 222. Bit 28 to bit 31 are unused address bits 230.

Figure 2B:
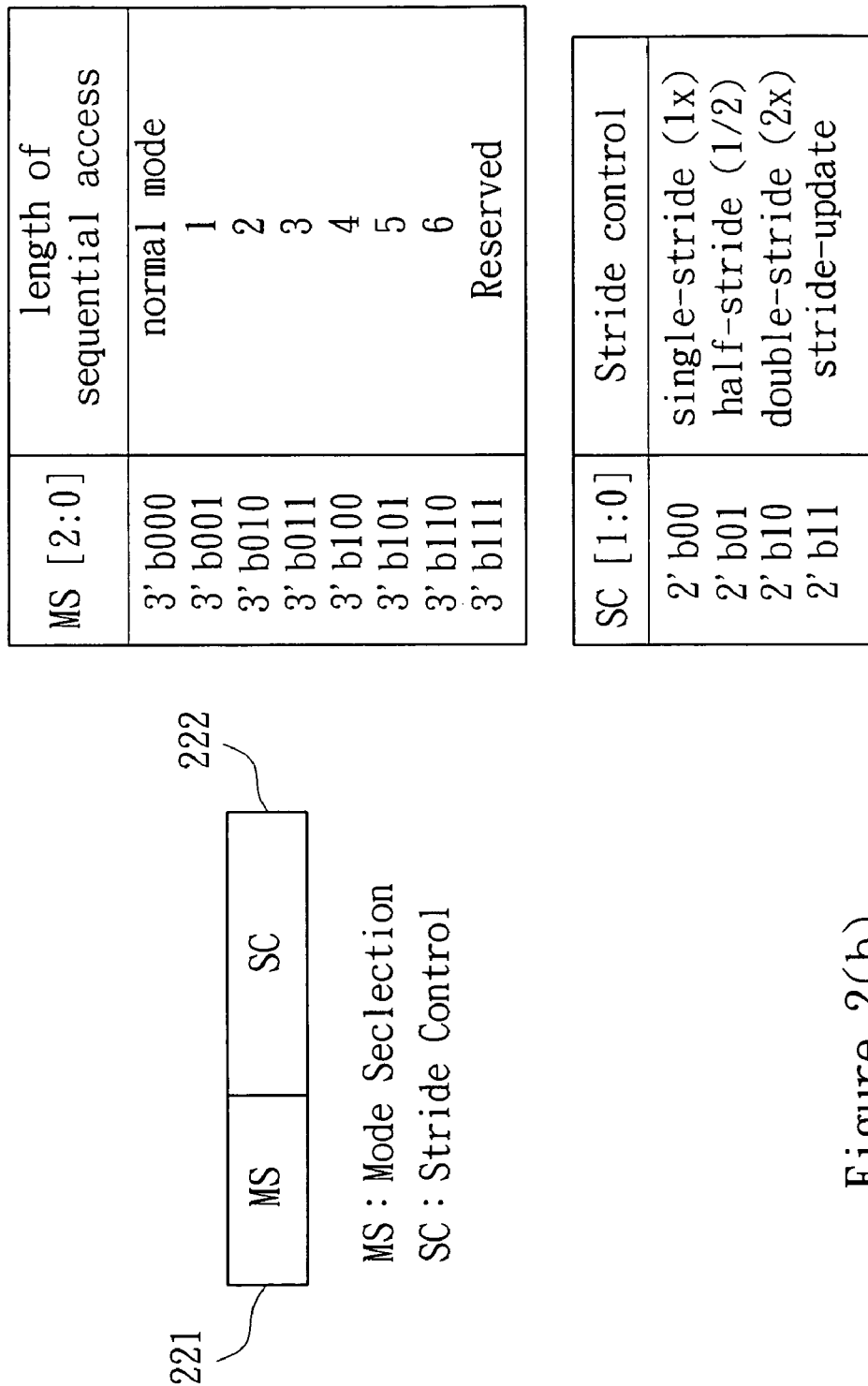
FIG. 2(b) is a schematic diagram of mode control information definition of the preferred embodiment of the present invention.

Refer to FIG. 2(b). FIG. 2(b) shows a schematic diagram of mode control information definition of the preferred embodiment of the present invention. FIG. 2(b) shows the details of mode selection 221 and stride control 222. When mode selection 221 is set as 0, it means the general reading/writing mode is enabled. In this mode, the address information refers to the AHB address bus and ignores the mode controlling information 220. When the mode selection 221 is not set as 0, the low latency 2-dimensional accessing mode is enabled. In this mode, the value of mode selection 221 indicates the length of the continuous data (in terms of word). The embedded address generator generates the next non-continuous address in advance according to the stride control 222. The MS[2:0] in FIG. 2(b) shows the mode selection 221 uses 3 bits and 3'b000~3'b111 denotes the 3-bit binary digits of mode selection 221.

The stride control 222 can be divided into four kinds of controlling methods: half-stride (½), single-stride (1×), double-stride (2×) and stride-update. The SC[1:0] in FIG. 2(b) shows the stride control 222 totally uses 2 bits and 2'b00~2'b11 shows the 2-bit binary digits of the stride control 222.

If the stride control 222 is set as stride-update, the write data of current AHB write transfer is saved as the stride value. Supporting half-stride and double-stride types facilitates the 2-D block access of chrominance data and interlaced data in image/video applications. The bit widths of physical memory address and mode control information can be adjusted according to how large the memory is and the user requirement, respectively. If the used modes need to be increased (for example, MS is expanded to 4 bits to define 16 modes), unused bit 230 can be used to achieve the expansion goal and make the memory controller flexibly support various kinds of modes.

Figure 3:
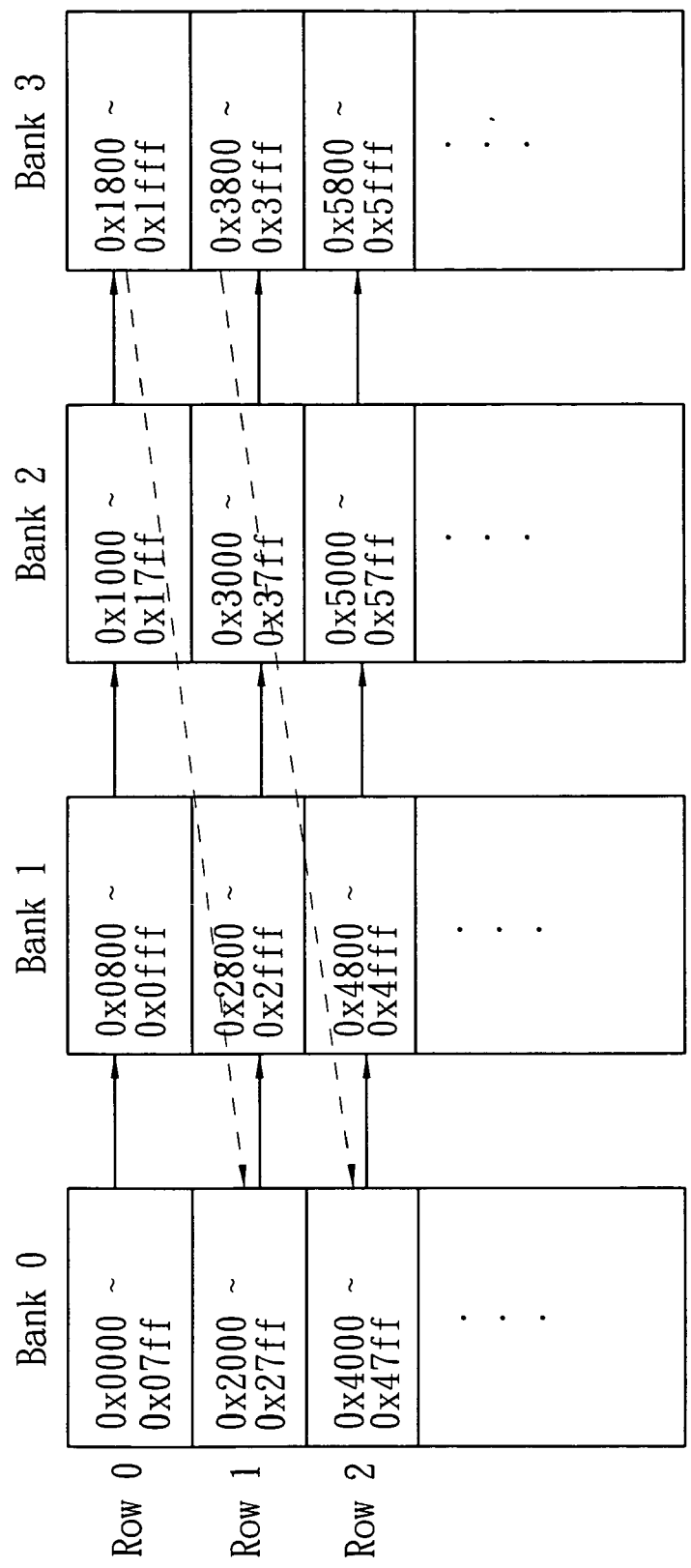
FIG. 3 is a schematic diagram of SDRAM data organization of the preferred embodiment of the present invention.

Refer to FIG. 3. FIG. 3 shows a schematic diagram of SDRAM data organization of the preferred embodiment of the present invention. The order of memory address is based on the consecutive row address with interlaced banks. In other words, this kind of data arrangement limits the non-continuous accessing of the 2-dimensional data to two states if the stride value is no larger than the size of N-1 row in an N bank memory device. The first state is the next non-continuous data are now located in the row of present accessing. In this case, the accessing method of BTB can be used directly to avoid latency. The second state is that the next non-continuous data are located in the rows of the different memory banks. In this case, this invention utilizes the latency or time interval between successive DRAM commands and activates the next accessing row in a particular bank in advance in order to reduce the controlling latency needed when switching into a different memory bank.

In digital signal processing and video decoding applications, the block size of 2-dimensional accessing is not fixed. Therefore, the length of continuous data accessing may not consist with the burst length of SDRAM. When the burst length is longer than the length of the accessing data, the burst terminating command can finish burst accessing early in order to achieve a higher transmitting rate and avoid incorrect writing operations. However, the burst terminate command still consumes a command delay for next transfer. When in low latency 2-dimensional data accessing mode, the sequential access length and next non-sequential access address are both available from mode control information 220 and embedded address generator 120. In this case, the burst of present sequential accesses can be terminated by the burst starts from the impending non-sequential access. However, the impending non-sequential access may not map to the row/bank of present access. Hence, finding the slots among SDRAM commands and exploiting these slots to activate the row of next non-sequential access beforehand is helpful for reducing the latency.

By analysis of the commands and properties of SDRAM, the command slots can be found in precharge, activate, burst access, and CAS latency. The number of available slots depends on the working frequency, burst length, and the delay time of commands.

Figure 4:
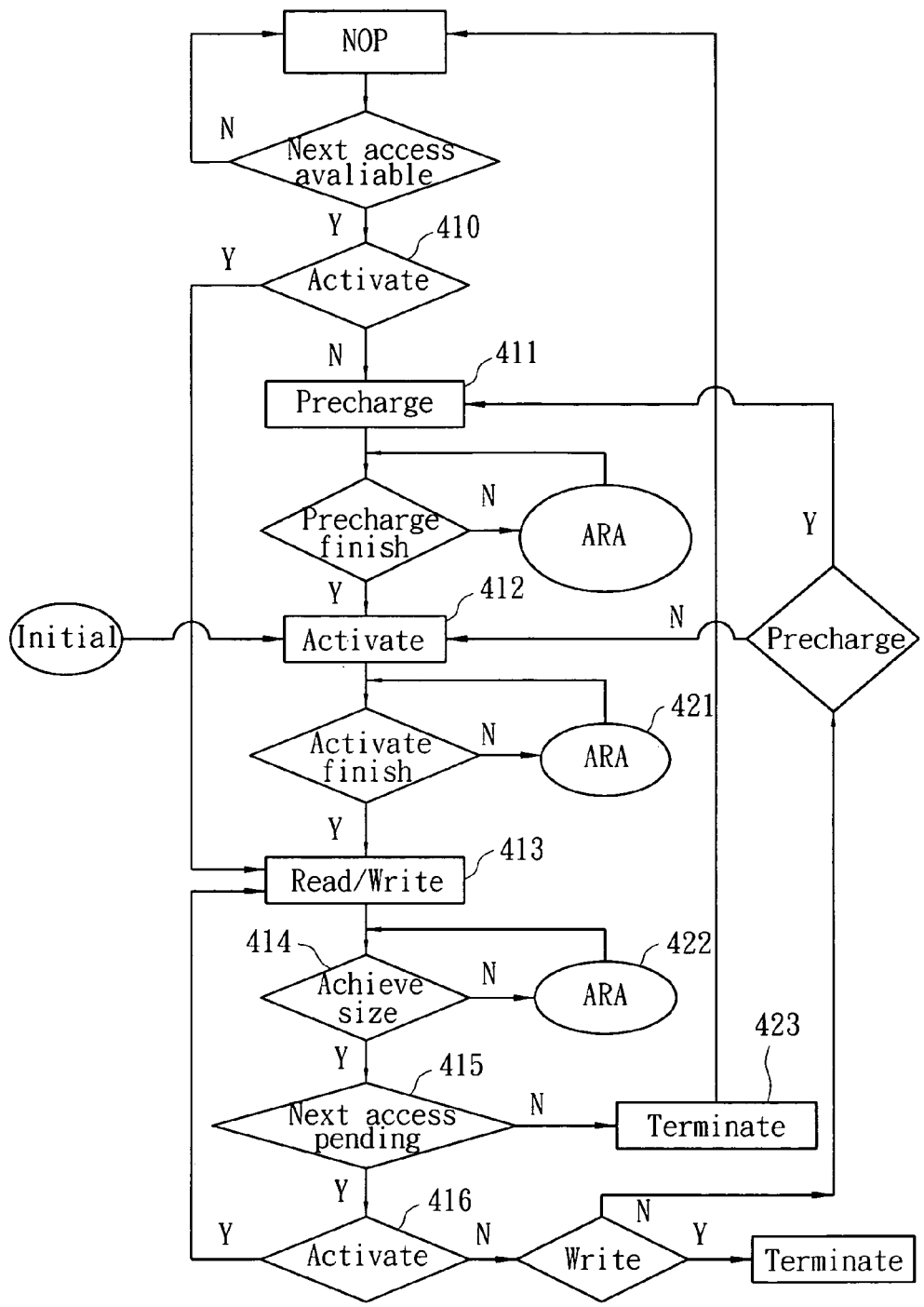
FIG. 4 is a flow chart of memory controlling flow of the preferred embodiment of the present invention.

Refer to FIG. 4. FIG. 4 shows a flow chart of the memory controlling flow of the preferred embodiment of the present invention. This controlling process includes BTB and ARA. In this controlling process, the precharge command is not issued immediately after burst read/write for diminishing the frequency of row activation. That is, if an accessed row is not opened (or activated), the precharge 411 command has to be issued to deactivate the row already opened in the bank before activating the desired row. After initiation of SDRAM and transfer ready, activate 412 command is issued for a particular row according to the address. The command slots leaded from row activate 412 are checked for ARA 421 control. When finishing the activation, the read or write (Read/Write 413) command is issued for column access. At this time, the counter unit is set to accumulate the length of read or write operations. In the meanwhile, the command slots of CAS latency and burst transfer are checked to entering ARA 422 control until the value of counter is matched with the desired sequential access length. After that, the controller checks whether next transfer is pending or not 415. If it is not, burst terminate 423 command is issued and then goes to the idle state (NOP). Otherwise, the status of the row of next access is checked. If the row of access is not opened, then entering the flow for activating this row. On the other hand, the read or write (Read/Write 413) command is issued directly to terminate the current burst access.

Figure 5:
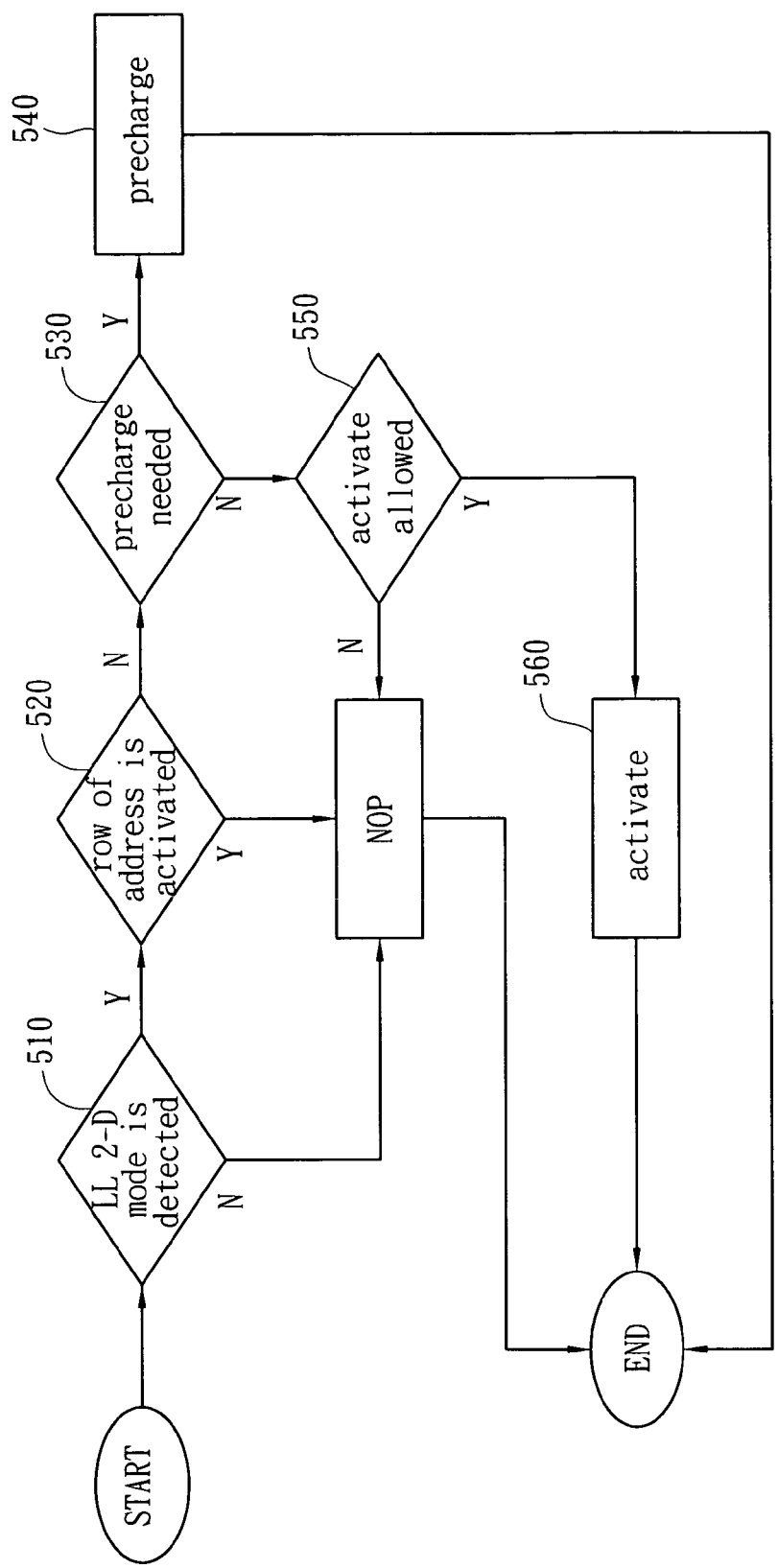
FIG. 5 is a flow chart of ARA controlling flow of the preferred embodiment of the present invention.

Reference is made to FIG. 5, which shows a flow chart of ARA controlling flow of the preferred embodiment of the present invention. In ARA control flow, which includes several steps. The accessing mode is checked first. If general reading/writing mode is detected, go to idle state (NOP) and then exit ARA control.

Step 510 checks whether a low-latency 2-dimensional accessing mode (LL 2-D mode) is detected. Then step 520 checks if the row of the address generated from EAG is activated. If the row is not opened, then step 530 checks if it needs precharge. If yes, then issue precharge command at step 540 and exit ARA control. Otherwise, check whether the activate command is allowed to be issued or not at step 550. If it is allowed, the activate command is issued at step 560 and then exit ARA control, else go to the idle state (NOP) and then exit ARA control. Be sure to notice the step 560 that the activate command is not allowed to be issued when precharge or row activation is not completed.

Figure 6A:
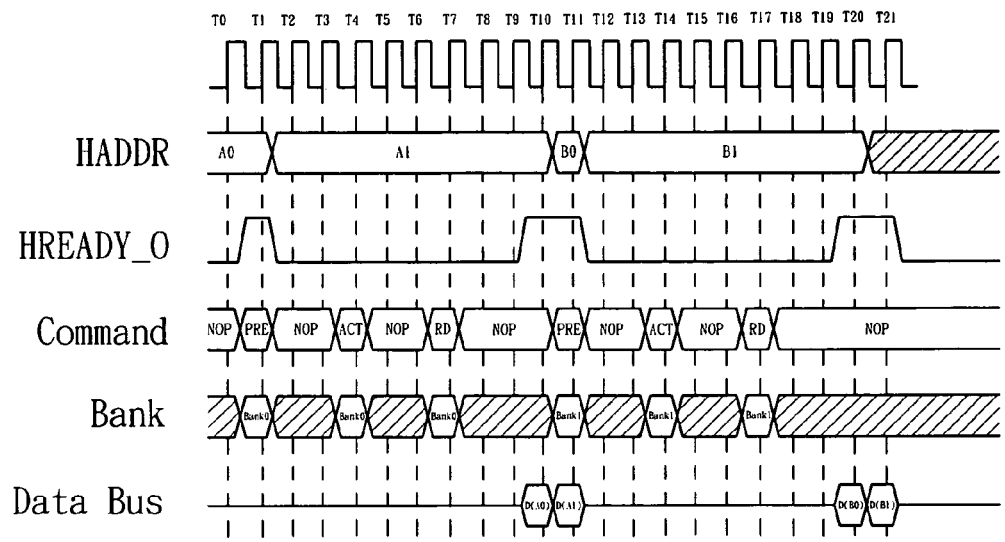
FIG. 6(a) is a schematic diagram of conventional timing waveform.
Figure 6B:
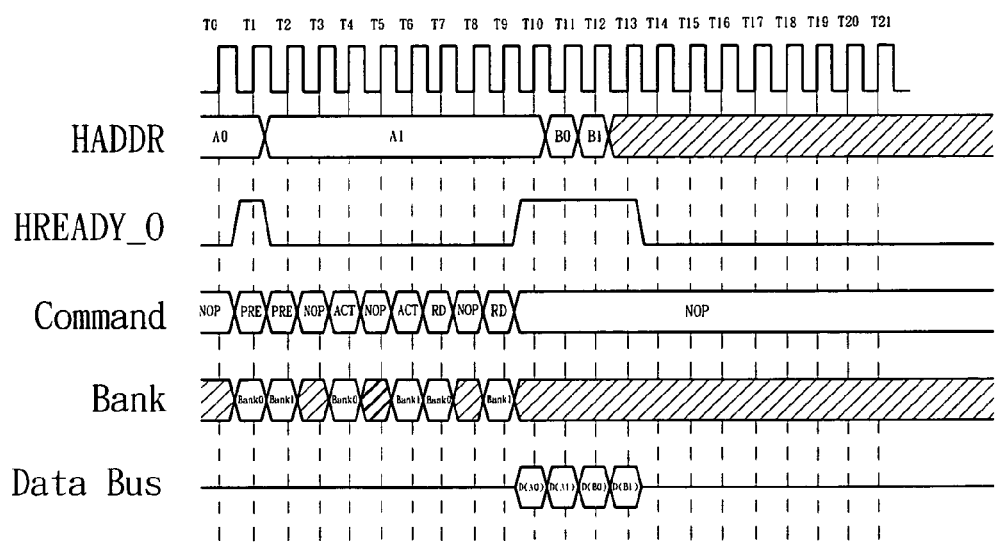
FIG. 6(b) is a schematic diagram of timing waveform of the preferred embodiment of the present invention.

Refer to FIG. 6(*a*) and 6(*b*). This timing waveform is based on the access of a 2 (word) by 2 block data with the assumption that the address A and address B are not mapped to the same memory row. FIG. 6(*a*) shows the timing waveform of generic memory controller with optimized finite state machine (FSM). Although the precharge command is issued coincident with the validation of address of the second non-sequential transfer, i.e., B0, the latency is still long so that it is inefficient. The timing waveform of the present invention is shown in FIG. 6(*b*). It can be seen that the precharge and activation commands forth e row of address B is issued at T2 and T5 respectively. Therefore, the read command for address B can be issued at T9 in the present invention. The cycles required for accessing a 2 (word) by 2 block data in the present invention is reduced from 21 to 13.

In conclusion, the present low-latency memory controlling scheme reduces the latency of 2-D data access, and also diminishes the required memory bandwidth. Furthermore, the proposed memory controlling scheme can be applied to multi-dimension array data access by extending the mode control information.

It will be apparent to those skilled in the art that various modifications and variations can be made to the structure of the present invention without departing from the scope or spirit of the invention. In view of the foregoing, it is intended that the present invention covers the modifications and variations of this invention provided they fall within the scope of the following claims and their equivalents.

What is claimed is:

1. A memory controlling method, comprising:
   (a) allocating a addressing space larger than a physical memory size and obtaining the bits for transferring mode control information;
   (b) using the mode control information to setup a 2-dimensional stride and a length of sequential data of 2-dimensional data;
   (c) using an embedded address generator to obtain the non-continuous addresses of 2-dimensional data accessing in advance by the 2-dimensional stride;
   (d) applying a burst terminates burst scheme for generating a command to continuously access SDRAM; and
   (e) applying an anticipative row activating scheme for activating the memory row of impending access in advance.

2. The method for memory controlling of claim 1, wherein the address bus contains an mode control information.

3. The method for memory controlling of claim 2, wherein the mode control information comprises mode selection and stride control.

4. The method for memory controlling of claim 1, wherein the 2-dimensional stride is the frame width in video applications.

5. The method for memory controlling of claim 1, wherein the length of the sequential data of a 2-dimensional data is the width of a 2-dimensional block.

6. The method for memory controlling of claim 1, wherein the anticipative row activating, comprises:
   applying the burst terminates burst to avoid latency, when a next non-sequential data in the same memory row; and
   activating a row in advance through the command slots, when a next non-sequential data in a row of another bank.

* * * * *